United States Patent [19]

Juday

[11] Patent Number: 5,083,378
[45] Date of Patent: Jan. 28, 1992

[54] TWO DIMENSIONAL VERNIER

[75] Inventor: Richard D. Juday, Houston, Tex.

[73] Assignee: The United States of America as represented by the Administrator, National Aeronautics and Space Administration, Washington, D.C.

[21] Appl. No.: 640,775

[22] Filed: Jan. 14, 1991

[51] Int. Cl.$^5$ .............................................. G01B 5/02
[52] U.S. Cl. .................................. 33/10; 33/15 D; 33/520; 33/644
[58] Field of Search .............. 33/1 D, 1 C, 1 E, 1 G, 33/15 D, 520, 644, 679.1, 563, 494

[56] References Cited

U.S. PATENT DOCUMENTS

| | | | |
|---|---|---|---|
| 2,088,533 | 7/1937 | Phelps | 33/1C |
| 2,235,177 | 3/1941 | Stark | 33/1 SD |
| 2,546,836 | 3/1951 | Saloschir | 33/1 SD |
| 2,775,404 | 12/1956 | Lahr | 33/1 SD |
| 2,916,825 | 12/1959 | Parsons | 33/1 SD |
| 2,991,555 | 7/1961 | Cambiaso | 33/1 SD |
| 3,388,474 | 6/1968 | Rosenvold et al. | 33/1 C |
| 3,646,681 | 3/1972 | Koenig | 33/1 SD |
| 3,890,716 | 6/1975 | Hatch | 33/1 D |
| 3,906,465 | 9/1975 | Morlwaki et al. | 340/173 LM |
| 4,092,779 | 6/1978 | Stokie | 33/1 SD |
| 4,368,578 | 1/1983 | Carroll et al. | 33/1 SA |
| 4,446,624 | 5/1984 | Nowell et al. | 33/1C |
| 4,459,702 | 7/1984 | Medwin | 33/1 D |
| 4,599,798 | 7/1986 | Steele | 33/1 B |
| 4,742,233 | 5/1988 | Kuyel | 250/491.1 |
| 4,870,559 | 9/1989 | Hyatt | 364/130 |

FOREIGN PATENT DOCUMENTS 0612500  7/1979  Switzerland ................ 33/1 D

Primary Examiner—William A. Cuchlinski, Jr.
Assistant Examiner—Alvin Wirthlin
Attorney, Agent, or Firm—Hardie R. Barr; John R. Manning; Edward K. Fein

[57] ABSTRACT

A two-dimension vernier scale utilizing a cartesian grid on one plate member with a polar grid on an overlying transparent plate member. The polar grid has multiple concentric circles at a fractional spacing of the spacing of the cartesian grid lines. By locating the center of the polar grid on a location on the cartesian grid, interpolation can be made of both the X and Y fractional relationship to the cartesian grid by noting which circles coincide with a cartesian grid line for the X and Y direction.

14 Claims, 3 Drawing Sheets

TWO DIMENSIONAL VERNIER

ORIGIN OF THE INVENTION

The invention described herein was made by an employee of the United States Government and may be manufactured and used by and for the Government of the United States of America for governmental purposes without the payment of any royalties thereon or therefor.

FIELD OF THE INVENTION

This invention relates to a two dimensional vernier measurement system for determining fractional components of an intermediate location relative to a cartesian grid.

BACKGROUND OF THE INVENTION

Methods of measurement include the use of one-dimensional mechanical devices which measure from point to point along a straight line. Vernier measuring devices utilize relatively movable scales where one scale has a slightly differing pitch or spacing of its indicia than the pitch or spacing of the indicia on the other scale. Usually the moving scale is provided with indicia having a different pitch than the indicia on the stationary scale. For example, the moving scale can have indicia with a pitch of 0.9 times the pitch of the indicia on the stationary scale. Thus with eleven scale marks or indicia on the moving scale, the first and the eleventh marks on the moving scale align with the first and the tenth marks or indicia on the stationary scale. Then as the moving scale is shifted to another position relative to the fixed scale, an alignment of a scale mark (between one and eleven) on the moving scale will occur with a scale mark on the fixed scale. The matching mark of the moving scale with a mark on the fixed scale denotes the fractional or decimal part of the stationary scale through which the moving scale has moved. By designating the first mark as zero ("0") and the eleventh mark as ten ("10") the fractional part can be measured in tenths of the base scale.

In some instances, the relative positioning of an object point or location on a screen, scope or map in terms of cartesian coordinates can be desired which requires location in both the X and the Y directions. Heretofore, the location between grids was based principally upon approximation rather than measurement.

PRIOR PATENT ART

U.S. Pat. No. 3,890,716 issued to Donald Hatch on June 24, 1975 (class 33/1) relates to a small vernier indicator. The vernier includes a first or lower dial member and a second upper dial member for measuring the shaft rotation of a potentiometer. The dials have different scales with the lower dial having two scales. The outer dial is transparent and the shaft rotational position can be determined from the scaling indicia.

U.S. Pat. No. 3,906,465 issued to M. Moriwaki on Sept. 16, 1975 (class 340/173) relates to a hologram graphic data tablet apparatus with vernier lasers and determines electronically a two dimensional location of an object and utilizes a vernier action.

U.S. Pat. No. 4,092,779 issued to B. M. Stokie on June 6, 1978 (class 33/15D) relates to a device for determining angle relationships of dips in earth formations. The device includes a dip disc having families of curves, a sheet of white paper, a transparent disc with a family of curves and a grid, transparent tracing paper and a ruler. The purpose of the system is to construct dip planes for geological formations.

U.S. Pat. No. 4,368,578 issued to W.J. Carroll on Jan. 18, 1983 (class 33/15A) discloses an orbital mission planning indicator which is a graphic display of the angle between the solar radiant vector and the plane of orbit of an artificial earth satellite. The planning indicator allows a person to visualize an orbit on a global scale.

U.S. Pat. No. 4,446,624 issued to Larry H. Nowell on May 8, 1984 (class 33/1C) relates a transparent overlay with various distance, bearing and position cues thereon for use in conjunction with a radar scope and training for coordinating the movement of air craft.

U.S. Pat. No. 4,599,798 issued to J. Steele on July 15, 1986 (class 33/1B) relates to a transparent overlay for facilitating printed work of a computer by use of the overlay with a cathode ray screen.

U.S. Pat. No. 4,742,233 issued to B. Kuyel on May 3, 1988 (class 250/491.1) relates a method for determining the lateral offsets between first and second overlapping vernier patterns of a semiconductor wafer. Two images are compared for the location of the maximum of correlated images and an offset error is determined.

U.S. Pat. No. 4,870,559 issued to G. P. Hyatt on Sept. 26, 1989 (class 364/130) relates to a high precision transducer in which discrete optical coding is combined with an optical analog vernier to achieve precision in a rotation angle.

SUMMARY OF THE PRESENT INVENTION

The present invention involves a transparent polar grid member which has a pitch or spacing of circular grid lines at a predetermined pitch relative to the pitch or spacing of lines in a cartesian coordinate grid. By use of a cartesian grid, [where an X abscissa and a Y ordinate intersect at an origin], a location on the cartesian grid can be designated by its distance and direction from the origin with respect to the X and Y axes. The transparent polar grid overlay (with circular grid lines arranged about a polar center), is aligned with its polar center on the location to be determined relative to the cartesian grid. The scale marks on an X and Y axis on the cartesian grid are a stationary measurement and the alignment of a numbered circular grid line on the polar grid overlay with an X axis grid line and with a Y axis grid line will provide a vernier dimensional indication of the additional fraction of the cartesian grid for the X axis and for the Y axis with respect to the location on the cartesian grid.

In practicing the method of the present invention, the location point to be identified relative to the cartesian grid lines is centered with respect to the polar center point of an overlay containing circular grid lines where the diameter of the inner circular grid is greater than the spacings of the cartesian grid lines to provide an identifiable overlap relationship between the polar circular grid line locations and a Y axis from the location point and between the polar circular grid line locations and the X axis from the location point. The overlap or coincidence of a circular grid line with an X grid line and a possibly different circular grid line with a Y grid line provides a vernier measurement indication of the fractional measurement of the location point with respect to each of the cartesian ordinates.

DESCRIPTION OF THE PRESENT INVENTION

Figure 1:
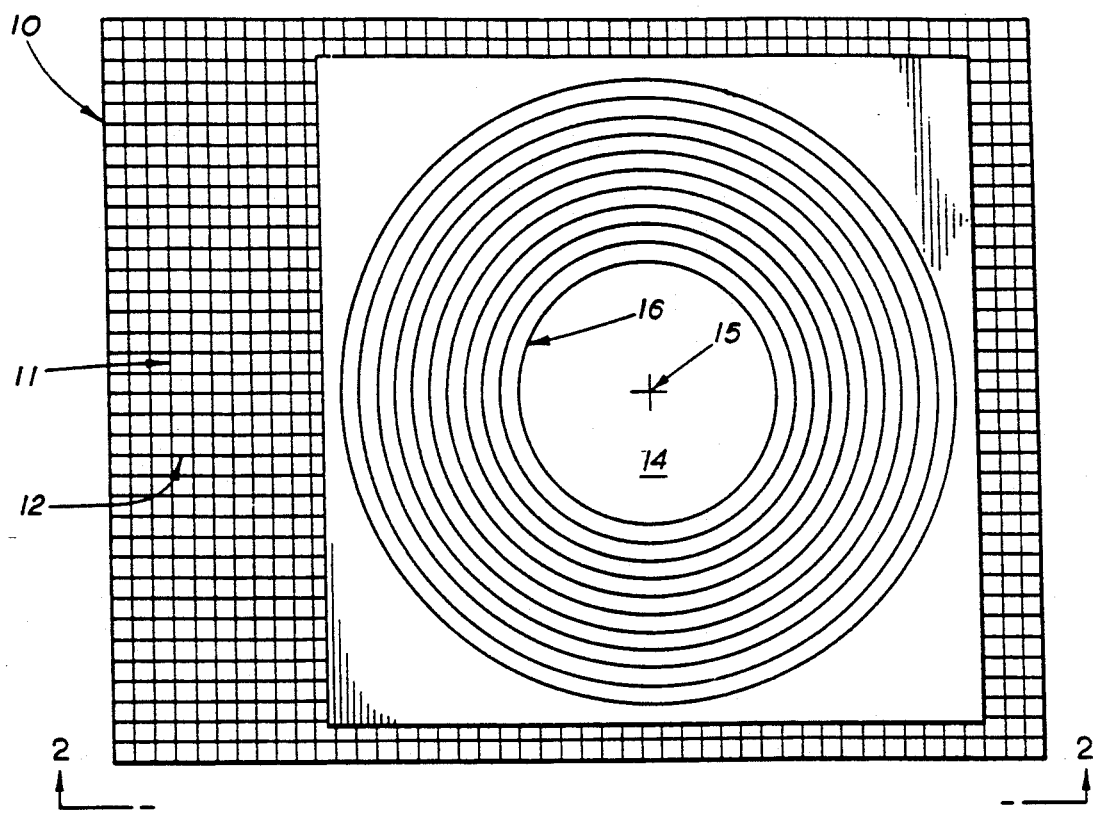
FIG. 1 is a representation of an underlying cartesian grid with a transparent polar grid overlay.
Figure 2:
FIG. 2 is a view taken along line 2—2 of FIG. 1.

As shown in FIG. 1, a cartesian grid with a linear scale may be provided on a separate transparent plate member 10 where vertical grid lines 11 are parallel to one another with a uniform spacing and where horizontal grid lines 12 are parallel to one another with a uniform spacing. The spacing of the horizontal and vertical grid lines is made equal when concentric circles are used in an overlay. A polar grid plate member 14 is a slidable overlay on the plate member 10 and has a polar center 15 and concentric circles with a uniform spacing. By locating the center 15 on a location point on the plate member 10, vernier grid lines 16 enable a decimal measurement of the X and Y values within a grid square on the plate member 10.

Figure 3:
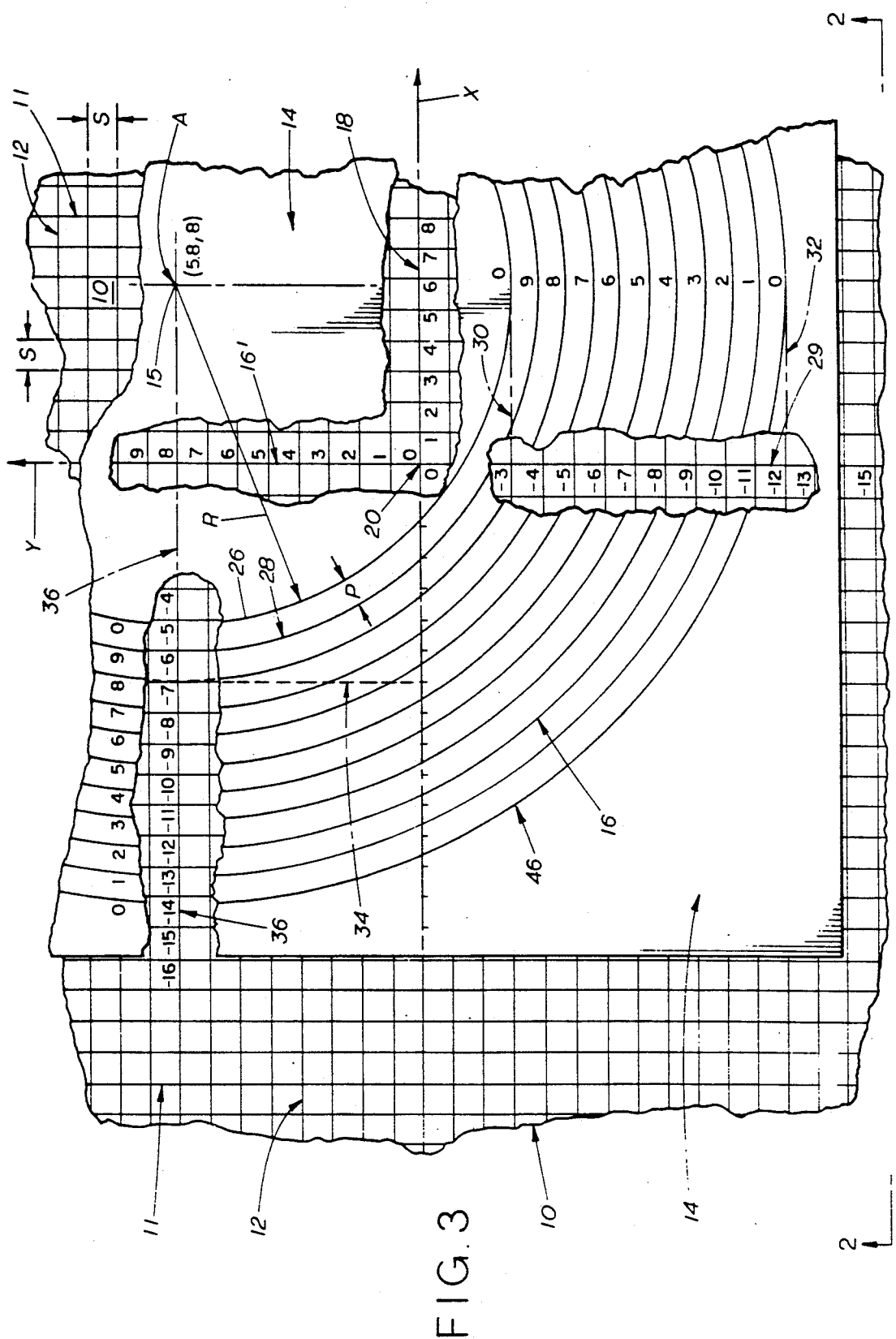
FIG. 3 is a view of an overlay of a polar grid member on a cartesian grid member with some cut-away sections for illustration of the relationships.

As shown in more detail in FIG. 3, in the rectangular coordinate system illustrated, a Y axis line 11 intersects an X axis line 12 at an origin point 20 and divides the cartesian grid into four quadrants. By convention, points on the X axis to the right of the origin point 20 and points on the Y axis up from the origin point 20 are positive. All points on the X axis to the left of the origin point 20 and all points on the Y axis down from the origin point 20 are considered negative. Of course, other conventions can be used, if desired.

In the polar grid for a separate transparent plate member 14, as shown in FIG. 3, a polar center point is shown at 15. A first inner circular grid ring 26 has a radius "R" which is large relative to the spacing between the grid lines 11 and 12. The value of R should be integer multiple of the grid spacing. The X and Y grid lines 11 and 12 have equal spacings as illustrated in FIG. 3. The spacing "p" between the inner circular grid ring 26 and the next circular grid ring 28 is a fraction of the spacing "s" between grid lines 11 or 12. By using a spacing "p" between adjacent circular grid rings where "p" is equal to $$P = 0.9(s) \tag{1}$$

there will be ten (10) spaces between the inner circle 26 and an outer circle 46. The eleven circular grid lines defining the ten (10) spaces can be numbered 0,1,2,3,4,5,6,7,8,9,0 as shown in the drawing. The linear diametrical measurement of ten (10) spaces between the lines 26 and 46 is equal to a linear measurement of nine (9) spaces on the cartesian grid 10.

As shown in FIG. 3 in an application of the present invention, the underlying transparent disc or plate member 10 has the Y and X axis lines 11 and 12 which denote various scale divisions or locations from a central or zero point 20. The spacing of the X and Y grid lines as well as the numbering of the grid lines is a matter of choice. In some instances, the grid line relationship may be already superimposed upon a cathode ray screen or the like or may appear as grid markings on a map or the like so that the underlying cartesian grid may be a part of the object on which the measuring is accomplished. In any event, the cartesian grid spacing in the X and Y directions is uniform and equal for the simplest application. Thus as shown at point A, and with the line designation numbers shown, the actual values of the coordinates for the location point A are "5.8" on the X axis and "8" on the Y axis.

The transparent overlay plate member 14 has the polar circular grids of eleven concentric circle lines with a pitch (the spacing between circles) of 0.9 times the pitch (spacing) of the stationary cartesian grid lines. The radius of the smallest diameter circle 26 is made large with respect to the pitch of the spacing of the fixed cartesian grid lines.

When the polar center 15 of the circles on the overlay plate member 14 is centered on the point A as shown in FIG. 3, it can be seen that the X axis coordinate is located between the grid lines numbered five and six (i.e. greater than 5 and less than 6) and the Y axis is located on a Y grid line numbered 8. With the polar center 15 located at the point A for which the coordinates are to be determined, a location along a vertical Y axis 29 will show alignment of the first circle "0" on the plate member 14 with the "−3" value on the plate member 10 and will also show alignment of the eleventh circle "0" on the plate member 14 with the −12 value on the plate member 10. Thus, the X axis lines 30,32 coincide with the first circle "0" and the eleventh circle "0" at Y = −3 and Y = −12. The coincidence of the "0" designated circles confirm that the Y location is at a value of exactly eight (8) spacings in a Y direction. On the other hand along the X axis from the location point A, the eleven circles each miss an even integer X value except for the integer value of −7 (see line 34) where the circle numbered eight (8) on the plate member 14 intersects the X axis 36 at an integer value of −7. Thus the location of the X ordinate is 5.8 units. By making the polar grid with circles which can be moved relative to the cartesian grid lines, there is no sensitivity to the relative rotational alignment between the polar circle on the one plate member and cartesian grid ordinates on the second plate member.

In the foregoing description, the spacing between the X and Y grid lines 12 and 11 is uniform and the same for each axis which makes the polar grid operative in any angular relation to the cartesian grid.

Figure 4:
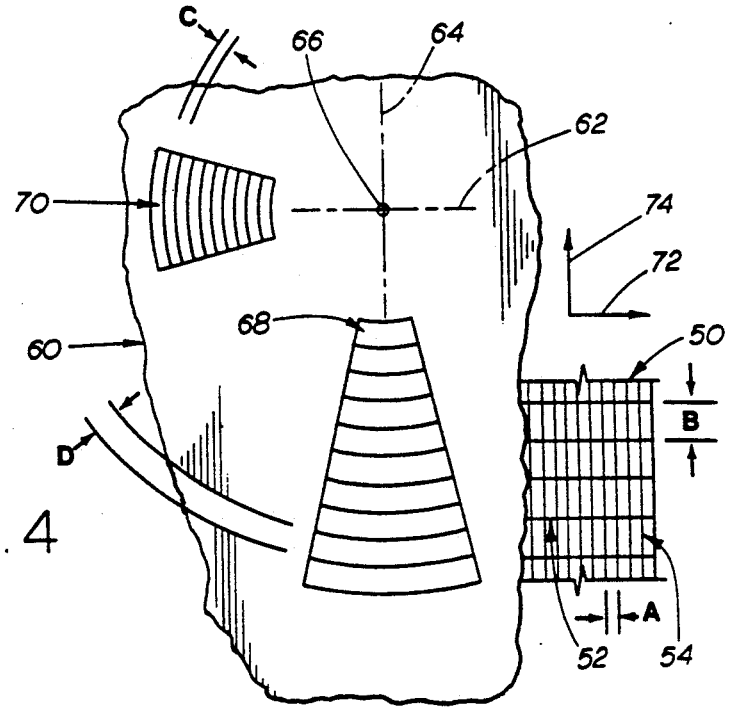
FIG. 4 is a fragmentary view of a cartesian grid with different scales and an overlay member with different scales.

The X grid lines can have a uniform spacing which is different than the uniform spacing of the Y grid lines. In this instance the overlay plate member also would have an X and Y axis for orientation relative to the cartesian grid. This form of the invention is shown in FIG. 4 where a cartesian grid 50 has X grid lines 52 at a uniform spacing which is twice the spacing of the Y grid lines 54. The transparent overlay member 60 has an X axis line 62 and a Y axis line 64 intersecting at an origin point 66. Vernier grid lines 68 with a circular arc arrangement in a pie-shaped configuration are aligned at a vernier spacing (0.9 times the spacing of the lines 52) along the Y axis 64. Vernier grid lines 70 with a circular arc arrangement in a pie-shaped configuration are aligned at a vernier spacing (0.9 times the spacing of the lines 54) along the X axis 62. This arrangement permits limited rotational freedom and permits a vernier interpolation of the Y fractional position with the lines 68 and the vernier interpolation of the X fractional position with the lines 70.

In the foregoing examples, the vernier has been described as 10 spaces (eleven lines) which total to 9 spaces (ten lines) on the cartesian grid. This provides a vernier measurement in tenths of the cartesian grid spacing. The number of vernier spacings can be increased or decreased to various integer numbers to obtain a vernier measurement in other degrees of preciseness.

Figure 5:
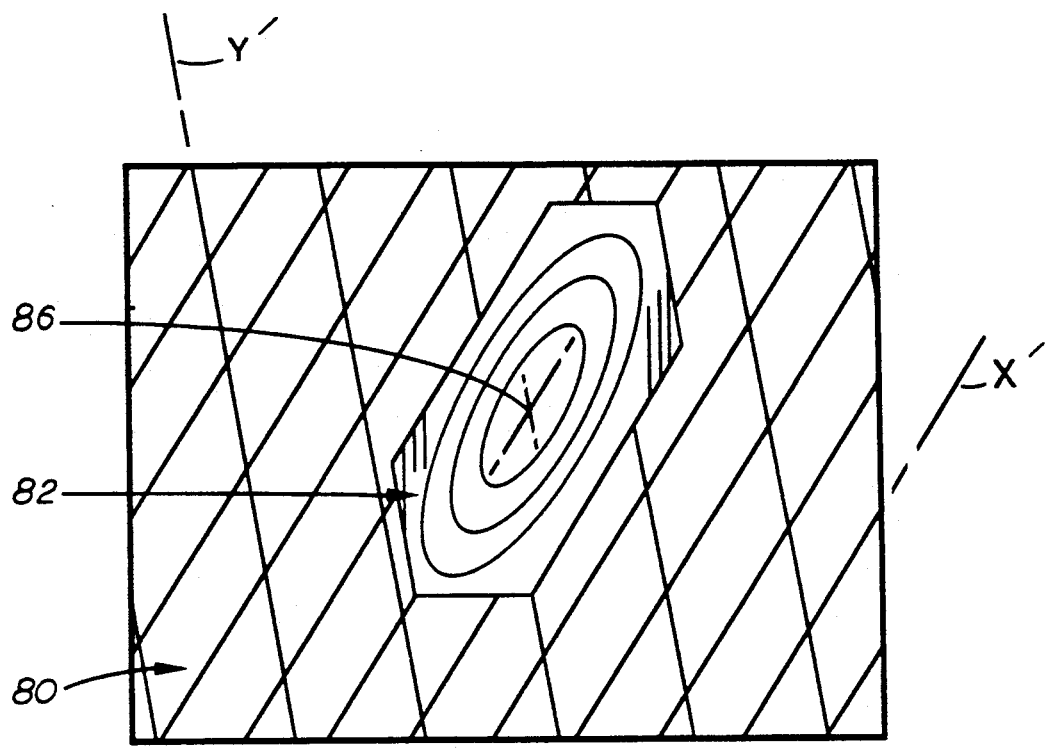
FIG. 5 is a fragmentary view of a linear transform grid system.

The underlying grids need not be cartesian but can be a linear transform of a cartesian grid as shown by the grid 80 and non-cartesian axes X' and in FIG. 5. The overlay grid 82 (not to scale) has concentric elliptical curves with the same linear transform about an origin 86. The origin 86 has axis markings to keep the elliptical curves properly aligned relative to the grid 80. Otherwise, the vernier measurements along X and Y axis is as described before.

Figure 6:
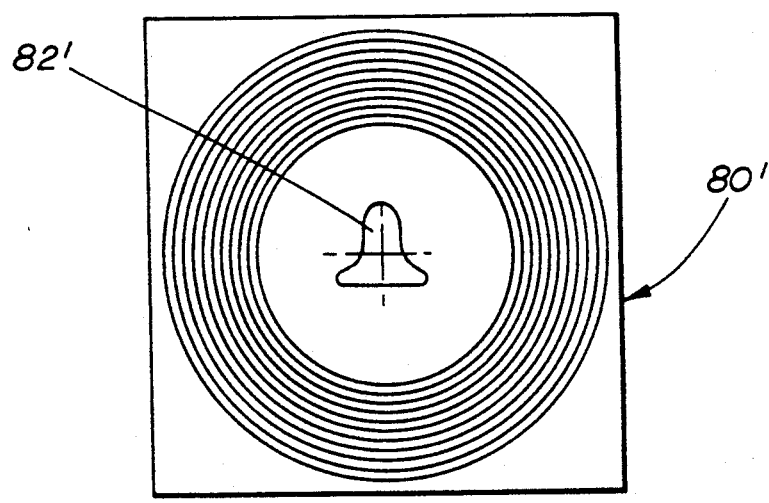
FIG. 6 is a view of an overlay member to obtain a more precise object location on a scope or screen.

In some cases on a scope or other display the object on the cartesian grid can have an outline or shape and the object can have a rotational orientation. In such instances as shown in FIG. 6, the overlay plate 80' can have a figure similar to the outline 82' of the shape of the object. The outline 82' thus can be rotated to fit the object at any location and the circular grids will dimensionally scale the X and Y locations irrespective of the angular position of the object. The concentric vernier circles on an overlay can be used to measure a location on an object which rotates in the X-Y plane. It should also be appreciated that the measurement is made from the relative positions of two patterns. Thus, though the system herein described as measuring the location of an object as placed in the cartesian frame, the base could be concentric circles and the overlay could be a cartesian grid.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A method of measuring a target location to fractional precision relative to an origin on an integer ruled grid having an X and a Y axis with a spacing dimension "A" between X axis integer lines and with a spacing dimension "B" between Y axis integer lines;
    locating the center polar point of an overlay transparent member having a polar ruled grid at said target location on said integer ruled grid where said polar ruled grid has a first set of circular arc lines intersecting an X axis on said polar grid and said circular arc lines of said first set have a spacing dimension "C" which is a fractional part of the spacing dimension "A" and has second set of circular arc lines intersection a Y axis on said polar grid and said circular arc lines of said second set have a spacing dimension "D" which is a fractional part of the spacing dimension "B";
    determining the integer grid coordinates of said target location relative to the origin on said X and Y axes; and
    determining the fractional value of the spacing between X axis integer lines and Y axis integer lines by determining which member of the first set of circular arc lines is most nearly tangent to any of the grid lines paralleling the Y axis, using the sequential index of that member as the interpolated fractional value on the X axis; and similarly determining which member of the second set of circular arc lines is most nearly tangent to any of the grid lines paralleling the X axis and using the sequential index of that member as the interpolated fractional value on the Y axis.

2. The method as set forth in claim 1 wherein the method is performed with a transparent base member which has the integer ruled grid and where the integer ruled grid on the transparent base member is first positioned over a plan representation and the target location is on said plan representation.

3. The method as set forth in claim 2 wherein the plan representation has an image outline and said overlay transparent member has a similar image outline for matching the angular orientation of the overlay transparent member to the plan representation.

4. A method of measuring a target location to fractional precision in dimensional coordinates relative to a cartesian grid including the steps of:
    positioning a transparent cartesian ruled grid member on a plan representation where at least one of an X axis and a Y axis of the cartesian ruled grid member is aligned parallel to a corresponding X or Y axis on the plan representation;
    locating a transparent overlay polar ruled grid member on said cartesian ruled grid member where said polar grid overlay member has a center polar point and has concentrically arranged circular grid lines and where said circular grid lines are spaced equally from one another by a predetermined proportional relationship relative to the spacing between grid lines on said cartesian ruled grid member;
    disposing said center polar point of said polar ruled grid member at said target location on said plan representation;
    determining integer coordinates of said target location relative to said X and Y axes on said cartesian ruled grid member;
    determining which member of the set of circular grid lines is most nearly tangent to any of the X grid lines on said cartesian ruled grid member and determining the sequential index of that grid line;
    determining which member of the set of circular grid lines is most nearly tangent to any of the Y grid line on said cartesian ruled grid member and determining the sequential index of that grid line; and
    using the indices of the most nearly tangent grid lines to the X and Y grid lines as the interpolated fractional values of the X and Y coordinates.

5. The method as set forth in claim 4 wherein the plan representation has an image outline and said transparent overlay member has a similar image outline for matching the angular orientation of the transparent overlay member to the plan representation.

6. A vernier system for measuring to fractional precision the location of a point relative to an integer ruled grid comprising:
    a first transparent plate member having X and Y indicia axes with a spacing dimension "A" between X indicia for defining X integer lines and with a spacing dimension "B" between Y indicia for defining Y integer lines;

a second transparent plate member having at least one polar point and an X indicia axis and a Y indicia axis which intersect at said polar point; and polar grid indicia on said second plate member including first arc lines intersecting said X indicia axis, said first arc lines having a spacing dimension "C" which is a fractional part of the spacing dimension "A" and said second plate member including second arc lines intersecting said Y indicia axis, said second arc lines having a spacing dimension "D" which is a fractional part of the spacing dimension "B" whereby coincidence of an arc line on an X or Y integer line can be noted to obtain a fractional dimension.

7. The system as set forth in claim 6 wherein said spacing dimension "A" is different than the spacing dimension "B".

8. The system as set forth in claim 7 wherein said integer ruled grid is in a linear transform and said first arc lines and said second arc lines are elliptical.

9. The system as set forth in claim 7 wherein said integer ruled grid is in a linear transform and said first arc lines and said second arc lines are circular.

10. The system as set forth in claim 6 wherein said spacing dimension "A" is equal to the spacing dimension "B".

11. The system as set forth in claim 10 wherein said integer ruled grid is in a linear transform and said first arc lines and said second arc lines are elliptical.

12. The system as set forth in claim 10 wherein said integer ruled grid is in a linear transform and said first arc lines and said second arc lines are circular.

13. The system as set forth in claim 6 wherein said integer ruled grid is located with respect to an object having an outline shape and said polar point is located with respect to an outline indicia, said outline indicia being similar in shape to said outline shape for orientation of the outline indicia with respect to the outline shape.

14. A vernier system for defining a location by dimensional coordinates relative to a cartesian grid including a first transparent cartesian ruled grid member with grid lines and having an X and a Y axis;

a second transparent overlay polar ruled grid member, said polar grid overlay having a center polar point and having concentrically arranged circular grid lines where said circular grid lines are spaced equally from one another by a predetermined proportional relationship relative to the spacing between grid lines on said cartesian ruled grid member so that for any location of the center polar point on the cartesian ruled grid member the fractional dimension of the polar point with respect to the cartesian grid lines is determined by the tangency of the circular grid lines with the cartesian grid lines.

* * * * *